United States Patent [19]

Fishbein et al.

[11] 3,943,075

[45] *Mar. 9, 1976

[54] POLYURETHANE FOAMS

[75] Inventors: John Fishbein, Marlow; Raymond William Henry Bell, Great Kings Hill; Anthony James Clarke, Chinnor; Peter Merriman, Stratford-On-Avon, all of England

[73] Assignee: Dunlop Holdings Limited, London, England

[ * ] Notice: The portion of the term of this patent subsequent to Dec. 31, 1991, has been disclaimed.

[22] Filed: Oct. 29, 1973

[21] Appl. No.: 410,515

Related U.S. Application Data

[63] Continuation of Ser. No. 148,171, May 28, 1971, Pat. No. 3,803,064.

[30] Foreign Application Priority Data

June 19, 1970 United Kingdom............ 30000/70

[52] U.S. Cl. 260/2.5 AW; 260/2.5 AB; 260/2.5 AJ; 260/2.5 AM; 260/2.5 BB; 260/77.5 NC; 260/2.5 AP

[51] Int. Cl.$^2$................ C08G 14/18; C08G 73/06
[58] Field of Search... 260/2.5 AW, 2.5 AP, 2.5 AJ, 260/2.5 AB, 77.5 NC, 2.5 AM, 2.5 BB

[56] References Cited
UNITED STATES PATENTS

| | | | |
|---|---|---|---|
| 3,108,975 | 10/1963 | Lambert | 260/2.5 AB |
| 3,336,242 | 8/1967 | Hampson | 260/2.5 AP |
| 3,546,145 | 12/1970 | Granger | 260/2.5 AP |
| 3,857,800 | 12/1974 | Fishbein | 260/2.5 |

*Primary Examiner*—C. Warren Ivy
*Attorney, Agent, or Firm*—Stevens, Davis, Miller & Mosher

[57] ABSTRACT

Flame-resistant polyurethane foams are obtained by a process in which a tolylene diisocyanate (T.D.I.) is reacted with a polymeric polyol in the presence of a substance which is normally effective for the polymerisation of T.D.I. and an anti-ageing additive such as a halogenated aliphatic phosphate, of which the following is a specification.

11 Claims, No Drawings

POLYURETHANE FOAMS

This is a continuation of application Ser. No. 148,171, filed May 28, 1971, now U.S. Pat. No. 3,803,064 granted Apr. 9, 1974.

This invention relates to flexible polyurethane foams, particularly to flame-resistant polyurethane foams, and to methods of making them.

Conventional polyurethane foams, particularly those derived from polyethers, have little inherent resistance to burning (flame-resistance), and in view of the widespread use of polyurethane foams in mattresses, cushions and other upholstery there exists a demand for flame-resistant products. Previous proposals for reducing the inflammability of flexible polyurethane foams have included the incorporation in the foam-forming reaction mixture of certain conventional flame retardants, for instance halogenated alkyl phosphates. However, these materials have either tended to be lost by evaporation during the foam-forming reaction or, if of sufficient molecular weight to preclude substantial loss by evaporation they have, because of their relatively high density, tended to concentrate in the lower regions of foam products during manufacture, especially where manufacture is by a continuous, free-rise method producing a foam loaf. Consequently, in order to ensure that sufficient flame retardant is included in the upper regions of the loaf it has been necessary to incorporate in the foam-forming reaction mixture an amount of such conventional flame retardant substantially in excess of that which would be required if the retardant could be distributed evenly throughout the foam loaf.

We have now found, according to the present invention, that flexible flame-resistant polyurethane foams can be obtained by a process in which a polymeric polyol is reacted with a tolylene diisocyanate (T.D.I.) in a foam-forming reaction mixture which contains: (a) as a foam modifier a substance normally effective as a catalyst for the polymerisation of tolylene diisocyanate, and (b) an anti-ageing additive substantially to limit any deleterious effect of the foam modifier on ageing of the polyurethane foam.

By "polymerisation of tolylene diisocyanate" above is meant in particular the polymerisation of three molecules of T.D.I. to produce a cyclic trimer usually of isocyanurate or perhydrotriazine structure. It is not known for certain whether the foam modifier in the present invention does in fact result in the polymerisation of the T.D.I. in the reaction mixture, but it is believed that polymerisation does occur, at least where pure T.D.I. is initially present.

A particular advantage of the foams of this invention is that when subjected to flame they give off much less smoke than do conventional flame-resistant foams. This is a most valuable practical advantage because emission of noxious smoke and fumes when subjected to flame is one of the principal shortcomings of such conventional flame-resistant foams.

Substances suitable as catalysts for the polymerisation of T.D.I., in particular polymerisation to give trimers of isocyanurate structure, are shown in the literature such as Saunders, J. R. and Frisch K. C. "Polyurethanes, Chemistry and Technology", Part 1, pages 94–97, & 212, Beitchmann, B. D. Rubber Age, Feb. 1966, Beitchmann B.D.I. & EC Product Research and Development, Vol.. 5, No. 1, pages 35–41, Mar. 1966, and Nicholas, L. and Gmitter, G.T.J. Cellular Plastics, Vol. 1, No. 1, pages 85–95 (1965).

Suitable substances are as follows:

a. Organic bases and salts and derivatives thereof, such as tertiary amines. Examples are triethylamine, tetramethylguanidine, nickel derivatives of bipyridyl and N-alkyl morpholines.

b. Alkaline inorganic compounds such as hydroxides, carbonates, oxides, bicarbonates and peroxides, and basic salts of weak inorganic acids. Examples are sodium hydroxide, sodium carbonate, sodium bicarbonate, sodium sesquicarbonate, sodium peroxide, sodium tetraborate (borax), sodium stannate, sodium tungstate, sodium molybdate and sodium silicate.

c. Alkali metal and other basic salts and derivatives of organic acids, phenols, mono- or di- carboxylic acids of aliphatic or aromatic nature, and of other organic acids such as benzene sulphinic acid, nitro phenols, picric acid, phthalimide, diethyl phosphite, acetic acid, halogenated-acetic acids, phenol ($C_6H_5.OH$) and other hydroxy-aromatic compounds, and alcohols. The carboxylic acid salts can be of acids having 6–20 carbon atoms, for example salts of octoic, 2-ethyl hexoic, benzoic or oleic acids. Examples are sodium acetate, sodium formate, sodium phenate, sodium salts of mono-chloro- dichloro- and trichloro- acetic acids, sodium methoxide, lead heptane carboxylate (lead octoate), calcium naphthenate and sodium benzoate.

The potassium and lithium compounds corresponding to the sodium compounds referred to above under headings (b) and (c) can be used. The corresponding alkaline earth compounds can also be used, though their efficacy is somewhat affected by their limited solubility.

d. Onium compounds of nitrogen, phosphorus, antimony, sulphur and selenium. Examples are tetramethyl-and tetraethyl- ammonium hydroxides, benzyltriethylammonium hydroxide, benzyltrimethylammonium hydroxide and tetraethyl phosphonium hydroxide. Of course, the particular substance or substances used as foam modifier in the process of the present invention should be such that there is no undesirable effect on the foam-forming reaction.

The foam modifiers of particular interest in the process of the present invention are basic substances, preferably readily soluble in water, and it is to such foam modifiers that the following description particularly relates.

The amount of the foam modifier incorporated depends upon the particular modifier used and the nature of the components of the foam-forming reaction mixute. Although larger amounts can be used, it is not, in general, necessary to use an amount greater than 1% by weight of the polyol component, and the preferred amount is 0.05–1%, especially 0.2–0.5%. However, where the foam modifier is a tertiary amine the preferred amount is somewhat greater, and amounts of up to 5% or even more may be found necessary for good results. The foam modifier, where water-soluble, is conveniently incorporated as a solution in water, for example in the water component of the foam-forming reaction mixture.

The polyol used in the production of the flame-resistant foams of this invention is normally a polyether polyol having a high reactivity, though polyesters can be used. Suitable polyether polyols are those having a substantial proportion of primary hydroxyl end groups, usually referred to as "ethylene oxide-tipped polyols".

However, other polyols can be used, and good results have been obtained using triols ("non-tipped polyols") such as those sold under the Trade Mark Varanol CP.3720. Suitable ethylene oxide-tipped polyols are those in which the primary hydroxyl groups comprise 20, 30, or 40% to 70% (for example 50–60%) of the total number of hydroxyl groups in that polyol. Where the polyol is a triol a suitable molecular weight is in the range 3000–6000.

A suitable polymeric polyol is one obtained by reacting a substance having a plurality of active hydrogen atoms with an alkylene oxide (for instance propylene oxide or a mixture of propylene oxide and ethylene oxide), and subsequently reacting the product thus obtained with ethylene oxide so as to introduce the terminal primary hydroxyl groups. Polyether polyols of this type are commercially available under the trade name Desmophen 3900 (which is a polyether triol of very high activity having a mean molecular weight of 4500–5100 and a hydroxyl number of 33–37), and Propylan M.12 described below with reference to the Examples.

The flame retardant foams of the invention can be, for example, foams of density up to 64 kg/m$^3$, especially having densities in the range 16–64 kg/m$^3$.

There is a marked tendency for the foams of this invention to shrink after being made due to closed cells in the foam. This can be overcome by mechanically squeezing or crushing the foam as is well known to those skilled in the art. However, we have found that shrinkage of the flame-resistant foams of the invention can be substantially obviated by the use of a polyether polyol derived from ethylene oxide in which at least some of the oxyethylene groups in the polyol molecule are in non-terminal positions. These subsidiary polyols which can for example be diols or triols, can contain from 20–80% (especially 40–70%) by weight of oxyethylene groups. Examples of suitable subsidiary polyols are the commercial products and Propylan G.3650 of Lankro Chemicals Limited. The subsidiary polyol can be used in any suitable porportion with the major polyol, but we have found it to be effective in substantially obviating the formation of closed cells if it is used in an amount of from 2–20 (for example 4–15) parts of the total polyol component of the foam-forming reaction mixture. Care should be taken in the amount of the subsidiary polyol used because too much leads to collapse of the foam. The subsidiary polyol is conveniently a poly(oxyethylene) poly(oxypropylene) polyol whose poly(oxypropylene) content has a molecular weight in the range 500–2000, for instance 800–1500. It can, for example, be a triol of molecular weight in the range 2000–3500. Where it has primary hydroxyl terminal groups they can comprise, for example, 35–45% of the terminal groups. The subsidiary polyol can be a substance consisting substantially of oxyethylene groups. Polyethylene glycols of low molecular weight, for example in the range 300–800 have been found suitable.

The subsidiary polyvol is preferably fed to the mixer for the foam-forming reaction mixture as a separate stream, though satisfactory results have been obtained where it has been previously blended with the major polyol and the blend fed to the mixer.

It has further been found according to the present invention that the ageing properties of the polyurethane foams can be improved, especially where the foam modifier is a substance containing an alkali metal, for instance sodium or potassium salts of phenols, or inorganic or carboxylic acids, or alkali metal hydroxides, or other basic substance, if there is incorporated in the polyurethane foam-forming reaction a neutralising anti-ageing additive, for instance a labile halogen-containing substance.

Suitable anti-ageing additives are as follows:

a. Halogen derivatives of phosphorus acids such as phosphoric, phosphorous and phosphonic acids.

Thus, the additives can be aliphatic phosphate esters, such as chloro- and bromo- derivatives of trialkyl orthophosphates, for example compounds of the formula $R_3PO$ where R is a halogenated — preferably polyhalogenated — alkyl group of 2, 3 or 4 carbon atoms. Examples of suitable anti-ageing additives are (a) Halogen derivatives of phosphorus acids such as ortho-phosphoric acid, phosphorous acid. Examples are tris bromopropyl phosphate, tris chloropropyl phosphate, tris bromoethyl phosphate, tris chloroethyl phosphate, tris 2,3-dibromopropyl phosphate, (T.B.P.P. — which is particularly effective), tris 2,3-dichloropropyl phosphate.

Other examples are: haloalkyl-alkenyl phosphates e.g. diallyl-2,3-dibromopropyl phosphate, bis (2,3-dibromopropyl) allyl phosphate and bis (2,3-dichloropropyl) allyl phosphate; 2-bromo diglycolyl phosphate; haloalkyl phosphonates e.g. bis (2-bromoethyl) phosphonate; diallyl phenyl phosphonate; alkyl phosphonium chlorides e.g. tetrakis (hydroxymethyl) phosphonium chloride; haloalkyl phosphites e.g. tris chloroethyl phosphite and tris bromoethyl phosphite.

b. Halogen derivatives of aliphatic (acyclic or alicyclic) or aromatic hydrocarbons Examples are derivatives of paraffins such as propane, e.g. 1,2,3-tribromopropane; halogenated benzenes and substituted benzenes, e.g. chloro-benzenes and pentabromotoluene; chlorinated and brominated polyphenyls, e.g. biphenyl, diaminoethoxy polyhalogenated biphenyl, dihydroxy hexachloro biphenyl and dihydroxy octachloro biphenyl; halogenated cycloalkanes e.g. perchloropenta-cyclodecane and -cyclododecane, derivatives of cyclopentadiene and adducts thereof such as adducts of hexachloro- or hexabromo-cyclopentadiene.

c. Halogen derivatives of aliphatic and aromatic hydroxy compounds as follows:

Examples are derivatives of

Alcohols, Examples are dichloro-pentaerythritol, pentaerythritol dichlorohydrin, chloromethyl pentaerythritol, pentahalophenoxy-2,3-propane diol, e.g., dibromo neopentyl glycol and 2(pentachlorophenoxymethyl)2-ethyl-1,3-propane diol, Bisphenols, Examples are halogenated bisphenol A (2,2-diphenyl propane), e.g. 2,2-bis(4-hydroxy-3,5 dibromophenyl) propane, tetrachloro bisphenol A, epoxylated polyhalobisphenols, Hydroquinones e.g. epoxylated tetrachlorohydroquinone.

d. Halogen derivatives of silicon compounds e.g. tetra (pentabromophenoxy) silane.

e. Halogen derivatives of ethers. Examples are: pentabromophenyl allyl ether, tribromophenyl allyl ether, halomethylated diaryl oxides and 1,2 bis (2,6-dichloro-4-alkoxycarbonyl-phenoxy)ethane.

f. Halogen derivatives of resins

Examples are: chlorinated polyethylene, chlorinated p.v.c. and chlorinated paraffin wax.

g. Halogen derivatives of alkylene oxides e.g. trichloropropylene oxide.

Although many of the compounds referred to above are themselves flame retardants and they contribute towards the flame-resistance of the foams, their effect in this direction is only minor and the flame-resistance of the foams is due in the main to the use of the foam modifier. The amount of anti-ageing additive to be used depends of course upon the particular inhibitor and also the type of foam in which it is to be used. However, in general an amount of 0.5–4 parts (especially 1.5–3 parts) per hundred parts of the polyol component has been found to be effective. Such amounts are much less than the amounts in which, for example T.B.P.P. is conventionally used as a flame retardant additive — usually about 15–20 parts per hundred of polyol. Where an organic bromo compound is used as the additive, it has been found that effective amounts are those corresponding to an amount of up to 0.25% (for example 0.05–0.1%) by weight of bromine per 100 parts of polyol component. Where the additive is a chloro compound the effective amounts are those corresponding to an amount of up to 0.5% (for example 0.1–0.2%) by weight per 100 parts of polyol component.

The anti-ageing additives are in general covalent organic compounds which contain labile halogen atom or atoms. Such compounds can lose their labile halogen (for example, as a result of interaction between the halogen and alkali metal ions). The additives should be such that neither they, nor the residual substance left after loss of the labile halogen, have an undesirable effect on the reactions in the foam-forming reaction mixture. It is thought that the preferred additives, referred to above, probably do not lose their halogen until the early stages of the foam-forming reaction are complete, but that they then lose their halogen (perhaps due to the exothermic heat produced in the reaction) which can then combine with alkali metal ions in the reaction mixture and thereby preclude their interference with the reaction mechanism or deleterious effect on the foam product.

Small amounts of amine catalysts may be used in the process of the invention, though it has not been found essential to use them where the polyol is an ethylene oxide-tipped polyol; but they are more necessary when using non-tipped polyols. Examples of tertiary amines which can be used are, for example, dimethyl ethanolamine, N-methyl and N-ethyl morpholines, triethylamine, and triethylene diamine (also known as 1,4-diazobicyclo 2,2,2,- octane).

Under certain circumstances, for example when harder foams are required, cross-linking agents may be employed. Examples of suitable cross-linking agents are hydroxy amines, for example triethanolamine and tetrakis N beta-hydroxypropyl ethylene diamine (sold under the trade name Quadrol); low molecular weight polyols, such as tetrols, hydroxyethers, for example tris-hydroxypropyl glycerol, and ortho-dichloro methylene bis-aniline.

In general the polyisocyanate and polyol components can be used in amounts such that the isocyanate index is of a normal value, for example in the range 100–110. However, isocyanate index values outside that range can be used if desired, but it has not been found necessary to exceed a value of 150.

The T.D.I. can be in a substantially pure state. Where T.D.I. is referred to herein it can contain one or more isomers thereof. For example, it can be tolylene-2,4-diisocyanate, tolylene-2,6-diisocyanate, or a mixture thereof, for instance in the proportions 65:35 (65:35 T.D.I.) or, preferably, 80:20 T.D.I.) by weight.

The T.D.I. can be, for example, crude T.D.I. or T.D.I. in polymeric form.

Crude T.D.I. is the product obtained by reacting the appropriate diamino-toluene with phosgene without any substantial purification. It is believed to contain material of polyurea and polybiuret structure. Where a mixture of 2,4- and 2,6-diamino-toluene is used, the crude T.D.I. contain the corresponding 2,4- and 2,6-diisocyanates.

Polymeric T.D.I. is normally of uretdione or isocyanurate structure. It can be obtained from pure T.D.I. in a separate preliminary reaction using polymerisation techniques well-known in the art and using catalysts referred to herein.

It has been found that the use in the process of the invention of large quantities of polysiloxane-oxyalkylene block copolymers should be avoided as they can detract from the flame-resistant properties of the polyurethane foams obtained. If a polysiloxane-oxyalkylene block copolymer is used it should preferably be in an amount less than 0.1% and preferably not more than 0.05%. However, small proportions of a polydimethyl siloxane as used in the Examples below is not objectionable, for example up to 0.1% by weight of the weight of the polyol component. Even larger quantities can be used if desired, and satisfactory foams have been obtained using amounts as follows:

| Viscosity of silicone | Amount (parts per 100 of polyol) |
|---|---|
| 2 centistokes | 0.5–4 |
| 5 " | 0.025–0.25 |
| 10 " | 0.05–0.1 |

The polyurethane foams of the invention can be obtained in moulded form by a cold-cure moulding method, that is, a method in which the foam-forming reaction mixture is moulded and allowed to cure without the application of heat.

Moreover, the foams of the invention are suitable for use in flame lamination to textile and other substrates.

Although it is not intended that the present invention should be construed with reference to any particular theory, it is thought that the foam modifier has the effect of producing a polyurethane foam having a structure different from that obtained in the absence of the foam modifier such that when subjected to flame the foam tends to collapse and thereby presents a reduced surface area to the flame. This view is supported by observation of what happens to a foam of the invention when subjected to a flame. For example, when a lighted match is placed on a block of the foam the portion subjected to the heat of the flame readily melts or decomposes and "retracts" away from the flame but without any sustained burning.

The invention is illustrated by the following Examples, in which flexible flame-resistant polyurethane foams are obtained by the one-shot or single stage method.

The meanings of various Trade Names used in the Examples are as follows: Propylan M.12 is the Trade Name of a polyether polyol sold by Lankro Chemicals Limited, and which is believed to be a poly(oxypropylene) poly(oxyethylene) triol having the following characteristics:

| | |
|---|---|
| Molecular Weight | about 5000 |
| Hydroxyl No. | 35–37 |
| Poly(oxyethylene) content | about 12–13% by weight |

It has a high proportion of primary hydroxyl end groups.

G.978 is an abbreviation for "Development Polyol G978" sold by Lankro Chemicals Limited. It is used in the Examples as an anti-shrinkage agent, and is believed to consist essentially of a poly(oxyethylene) poly(oxypropylene) triol based on a glycerol "starter" and having a molecular weight of about 2800, a hydroxyl number of 53–59 and a poly(oxyethylene) content of about 64% by weight. The proportion of primary hydroxyl groups: secondary hydroxyl groups in this polyol is believed to be in the ratio 40:60.

It will be seen that in Example 3 the polyol component contained a third polyol (as a cross-linking agent) referred to as "Quadrol" which is believed to consist essentially of the compound:

$$(CH_3CH(OH)CH_2)_2 N—CH_2—CH_2—N(CH_2—CH(OH)—CH_3)_2$$

In the Examples the silicone MS.200/5 is a commercial silicone oil having a viscosity of 5 centistokes and believed to be a dimethyl siloxane homopolymer, and the tris-dibromopropyl phosphate (T.B.P.P.) anti-ageing additive was used in the form of the commercial product Bromkal P.67. The T.D.I., except where states otherwise, was 80:20 T.D.I. The hardness values were obtained under the test of BS.3667. Reference in the Examples simply to "catalyst" is to the foam modifier.

EXAMPLE 1

A flexible, free-rise polyurethane foam was obtained using the following formulation:

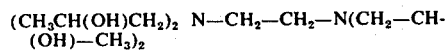
| | |
|---|---|
| Propylan M.12 } Polyol Component { | 90 |
| G.978 | 10 |
| Water | 3 |
| Sodium phenate | 0.4 |
| T.B.P.P. | 2 |
| Silicone MS.200/5 | 0.05 |
| T.D.I. | 36.5 |

In this Example, and in the other Examples, the amounts of the ingredients are shown in parts by weight.

The procedure used to make the foam was as follows. First, the silicone was dispersed in 2.5 parts of the Propylan M.12 polyol so as to provide a 2% solution; and the sodium phenate was dissolved in all of the water component. The remainder of the polyol component was then mixed with the T.B.P.P. and the polyol dispersion of the silicone by high speed stirring for 20 seconds. The aqueous solution of the sodium phenate was then added to the mixture and the whole was stirred for a further 15 seconds. Then the T.D.I. was added and the stirring was continued for a further 8 seconds, at the end of which time the resulting foam-forming reaction mixture started to "cream" and was immediately poured into an open mould.

The rise of the foam was completed in 90 seconds, and the foam was tack-free at the end of about 15 minutes after the pouring. At this time the resulting polyurethane moulding was removed from the mould.

The foam had a density of 29.4 kg/m³ and a hardness of 6 kg. and did not shrink on cooling.

EXAMPLE 2

A flexible, free-rise polyurethane foam was obtained using the following formulation and the procedure described in Example 1:

| | |
|---|---|
| Propylan M.12 } Polyol Component { | 90 |
| G.978 | 10 |
| Water | 4 |
| Sodium phenate | 0.3 |
| Silicone MS.200/5 | 0.05 |
| T.B.P.P. | 2 |
| T.D.I. | 46.5 |

The foam had a density of 24 kg/m³ and a hardness of 7–8 kg. and did not shrink on cooling.

EXAMPLE 3

A flexible, free-rise polyurethane foam was obtained using the following formulation and the procedure described in Example 1:

| | |
|---|---|
| Propylan M.12 } Polyol Component { | 82.5 |
| G.978 | 12.5 |
| Quadrol | 5.0 |
| T.B.P.P. | 2 |
| Water | 4 |
| Silicone MS.200/5 | 0.05 |
| Sodium phenate | 0.25 |
| T.D.I. | 52.4 |

The foam had a density of 25.0 kg/m³ and a hardness of 13–15 kg. and did not shrink on cooling.

EXAMPLE 4

A flexible, polyurethane foam cushion was obtained by a cold-moulding technique using the following formulation:

| | |
|---|---|
| Propylan M.12 } Polyol Component { | 95 |
| G.978 | 5 |
| Water | 3 |
| Sodium phenate | 0.5 |
| Triethylamine | 0.4 |
| Silicone MS.200/5 | 0.05 |
| T.B.P.P. | 2 |
| T.D.I. | 36 |

The foam-forming reaction mixture, obtained using the procedure of Example 1, the triethylamine being dissolved in the polyol, was dispensed into a metal mould which had been pre-heated to 50°C. A close-fitting lid was clamped into place on the mould by toggle clamps and the mould left for 10 minutes without any application of heat. The moulded product was then removed from the mould. It was found to have a density of 48 kg/m³ and did not shrink on cooling.

EXAMPLE 5

A flexible, free-rise polyurethane foam was obtained using the following formulation and the procedure described in Example 1:

| | |
|---|---|
| Propylan M.12 } Polyol Component { | 95 |
| G.978 | 5 |
| Water | 3 |
| Sodium phenate | 0.4 |
| T.B.P.P. | 2 |
| T.D.I. | 41.2 |

-continued

| | |
|---|---|
| Silicone MS.200/5 | 0.05 |

The foam had a density of 29 kg/m³ and a hardness of 10 kg. and did not shrink on cooling.

EXAMPLE 6

A flexible, free-rise polyurethane foam was obtained using the following formulation and the procedure described in Example 1, the triethylamine being dissolved in the polyol:

| | |
|---|---|
| Propylan M.12 (Polyol Component) | 100 |
| Water | 4.5 |
| Sodium phenate | 0.25 |
| Triethanolamine | 0.5 |
| Silicone MS.200/5 | 0.05 |
| T.B.P.P. | 2 |
| T.D.I. | 51.3 |

The foam thus obtained had a closed-cell structure but this was easily converted into an open-cell structure by passage through rollers. The rolled product had a density of 18.9 kg/m³ and a hardness of 8.5 kg.

The foams of the Examples were all found to have excellent flame-resistance. When tested under the conditions of ASTM D 1692 67T the following results were obtained:

| | EXAMPLE | | | | |
|---|---|---|---|---|---|
| | 1 | 2 | 4 | 5 | 6 |
| Mean extent burned (mm) | 14 | 29 | 13 | 22 | 29 |
| Burning time (seconds) | 10 | 22 | 13 | 24 | 12 |
| Burning rate (mm/second) | 1.4 | 1.32 | 1.0 | 0.91 | 2.4 |

Besides their excellent flame-resistance, the foams of these Examples were found to have high resilience — more than 50% as measured by the falling ball rebound test — and to show a relatively linear load-deflection relation.

EXAMPLES 7–14

Further flexible polyurethane foams were obtained using the procedure of Example 1 and the following formulations.

The foam of each of Examples 7–14 was found to be self extinguishing when tested according to ASTM D 1692/67T. That test was used for the products of all the following Examples except if stated otherwise.

Example 7 was repeated using the G.978 in amounts of 7.5, 8.5, 9, 11, 12 and 13.5 parts, instead of the 10 parts used in that Example. In each case the amount of Propylan M.12 used was such that the total weight of Propylan M.12 and G.978 was 100 parts. The foam products obtained in each case were self-extinguishing.

EXAMPLES 15–18

Example 7 was repeated but using the following labile halogen compounds instead of the T.B.P.P. Example 15: tris 2,3-dichloropropyl phosphate (as the commercial product Fryol F.R.2 — 2 parts) Example 16: tris β-chlorethyl phosphate (4 Parts) Example 17: 1,2,3-tribromo propane (1.2 parts) Example 18: dibromo-neopentyl glycol (2 parts) (In Example 18 the amount of T.D.I. was increased to 37.6 to take account of the hydroxyl groups in dibromo-neopentyl glycol).

The foam product of each of these Examples was self-extinguishing, and did not suffer deterioration on heat ageing for 16 hours at 140°C. However, in comparative Examples in which the halogen compound was omitted, the foam products had deteriorated so much at the end of 16 hours heat ageing that their relevant physical properties could not be measured.

EXAMPLES 19–21

These Examples illustrate the use of anti-shrinkage agents other than the polyol G.978 to obviate shrinkage of flexible foam products.

The procedure and formulation of Example 7 was repeated except that the following amounts of antishrinking agents were used instead of the G.978. In each case the total amount of Propylan M.12 and antishrinkage agent was 100 parts.

Example 19 Polyol R.161: 10–11.5 (for example 11.5) parts

Example 20 Polyol 1138: 9 (for example 7) parts

Example 21 Polyethylene glycol (PEG 600): 10–11.5 (for example 11) parts

Polyol R.161 and Polyol DP 1138 are respectively polyether triols sold by Union Carbide Corporation and Lankro Chemicals Limited. They have molecular weights in the range 2500–3500 and poly(oxyethylene) contents of about 65% and 79% by weight. The foam products obtained were self-extinguishing.

| Example No. | 7 | 8 | 9 | 10 | 11 | 12 | 13 | 14 |
|---|---|---|---|---|---|---|---|---|
| Catalyst | Sodium Hydroxide | | Sodium Carbonate (anhydrous) | | Sodium Stannate (Na₂SnO₃.) 3H₂O) | Sodium Formate | Benzyl trimethyl ammonium phenoxide | Potassium Phenate |
| (parts) | 0.15 | 0.25 | 0.4 | 0.2 | 0.5 | 0.4 | 0.5 | 0.45 |
| Propylan M.12 | 90 | 90 | 90 | 90 | 90 | 92.5 | 90 | 90 |
| G.978 | 10 | 10 | 10 | 10 | 10 | 7.5 | 10 | 10 |
| Water | 4.5 | 4.5 | 4.5 | 4.5 | 4.5 | 4.5 | 3 | 3 |
| T.B.P.P. | 2 | 2 | 2 | 2 | 2 | 0.4 | 2 | 2 |
| Silicone MS.200/5 | 0.05 | 0.05 | 0.05 | 0.05 | 0.05 | 0.05 | 0.05 | 0.05 |
| T.D.I. | 54 | 54 | 54 | 54 | 54 | 36.2 | 36.2 | 36.2 |
| Propamine A | — | — | — | 0.2 | 0.2 | | | |
| Foam Density (kg./m³) | 21 | 21 | 21 | 31 | 31 | 30 | 30 | 30 |

EXAMPLE 22

This describes the production of a flexible polyurethane foam moulding by the cold cure technique using a typical formulation of the present invention.

Propylan M.12 (288g.) was blended with 12g. of polyol G.978, 9 g. sodium carbonate solution (20g. Na₂CO₃ in 280g. water), 0.9 g. Dabco 33LV, 0.69 g. silicone MS.200/5 and 3.0 g. 98% pure triethanolamine. The blend was mixed with a high speed stirrer for 10 seconds, 30 g. trichlorofluromethane was added and stirring continued for a further 10 seconds. 114 g. of T.D.I. was then added and further stirred for 10 seconds. The mixture was the poured into a mould having a surface temperature of 58°C. The mould lid was clamped into place and the moulding left to cure without the application of heat for 10 minutes. The moulding obtained was of good appearance its density was 37 kg/m³ and the foam was self-extinguishing.

EXAMPLE 23

This Example illustrates the use of sodium salts of halogenated acetic acids as catalyst. Using the procedure of Example 1 flexible, free-rise foams were obtained from the following formulation.

| | | |
|---|---|---|
| Propylan M.12 | Polyol Component | 85.5 |
| G.978 | | 12.5 |
| Polyol EDP.500 | | 2 |
| Water | | 4.5 |
| Sodium monochloro acetate (S.M.C.A.) | | 0.4 |
| Propamine A | | 0.4 |
| T.B.P.P. | | 2 |
| Silicone MS.200/5 | | 0.05 |
| T.D.I. | | 63 |

The foam density was 21.9 kg/m³ and the burned length was 22 mm.

The polyol EDP.500 is a low molecular weight crosslinking tetrol, believed to contain ethylene diamine as starter nucleus and having a molecular weight about 500.

EXAMPLES 24 and 25

Example 23 was repeated except that instead of the S.M.C.A. was used respectively 0.52 part sodium dichloroacetate and 0.64 part sodium trichloroacetate. The flexible foam products obtained were as follows:

Example 24 — density 21.8 kg/m³; burned length 26 mm.

Example 25 — density 21.9 kg/m³; burned length 22 mm.

EXAMPLE 26

Example 23 was repeated but using tetramethyl guanidine (0.3 part) as catalyst instead of the S.M.C.A., and 0.3 part of Dabco 33 LV instead of the Propamine A. The flexible foam obtained was self-extinguishing.

EXAMPLE 27

Tetramethylammonium hydroxide was used as catalyst in the following formulation to produce a flexible foam.

| | |
|---|---|
| Propylan M.12 | 95 |
| G.978 | 5 |
| Water | 4.5 |
| T.D.I. | 61.5 |
| Silicone MS.200/5 | 0.05 |
| (CH₃)₄ N. OH | 0.34 |
| T.B.P.P. | 1 |

The foam obtained was self-extinguishing.

In a comparative Example withour T.B.P.P. the foam, though self-extinguishing, lost its flame resistant properties after heat ageing at 140°C. for 4½ hours.

EXAMPLES 28 and 29

These Examples illustrate the use as the major polyol of a poly (oxypropylene) poly(oxyethylene) triol sold by the Dow Chemical Company under the Trade Mark Voranol CP-3720. This polyol has a molecular weight of about 3500 and is believed to have a poly(oxyethylene) content, substantially in nonterminal positions, of about 10–11% by weight.

Flexible foams were obtained from the following formulations:

| Example 28 | | Example 29 | |
|---|---|---|---|
| Voranol CP-3720 | 100 | Voranol CP-3720 | 100 |
| Water | 4.5 | Water | 4.5 |
| T.B.P.P. | 2 | Na₂CO₃ | 0.2 |
| Daltogard WP | 1 | Silicone L-546 | 0.35 |
| NaOH | 0.15 | Daboo 33 LV | 0.40 |
| Stannous octoate | 0.10 | T.D.I. (120 | |
| Silicone L-546 | 0.35 | index) | 60.5 |
| T.D.I. (135 index) | 68.30 | | |
| Density | 25.8 kg/m³ | | |
| M.E.B. | 87.5 mm. | | |

Daltogard WP is triphenyl phosphite, and
Silicone L-546 is a polydimethyl siloxane poly(oxyalkylene) block copolymer.

EXAMPLE 30

This Example illustrates the use of co-catalysts with the T.D.I. polymerisation-type catalyst. A flexible foam was obtained from the following:

| | |
|---|---|
| Propylan M.12 | 92.5 |
| G.978 | 7.5 |
| T.D.I. (135 index) | 66.5 |
| Water | 4.5 |
| T.B.P.P. | 2 |
| Daltogard WP | 1 |
| NaOH | 0.15 |
| Propamine A | 0.2 |
| Silicone MS.200/5 | 0.05 |

The foam product was self-extinguishing, mean extent burned being 43 mm.

EXAMPLE 31

Example 30 was repeated but using 0.2 part of N,N-dimethylbenzylamine in place of the Propamine A. The product was self-extinguishing, mean extent burned being 54 mm.

EXAMPLE 32

Isophorone diisocyanate (IDI) was used in conjunction with the T.D.I. to provide a flexible foam.

| | |
|---|---|
| Propylan M.12 | 90 |
| G.978 | 10 |
| T.D.I. | 53.3 |
| Isophorone DI | 15 |
| Water | 4.5 |

-continued

| | |
|---|---|
| T.B.P.P. | 1 |
| Na₂CO₃ | 0.2 |
| Propamine A | 0.2 |
| Silicone MS.200/5 | 0.05 |

The product was self-extinguishing, mean extent burned being 39 mm.

EXAMPLE 33

A crude M.D.I. sold under the Trade Mark Isonate 143-L, and believed to be a carbodiimide-modified M.D.I. was used in conjunction with T.D.I.

| | |
|---|---|
| Propylan M.12 | 95 |
| G.978 | 5 |
| T.D.I. } NCO index 135 | 45.5 |
| M.D.I. } | 30 |
| Water | 4.5 |
| T.B.P.P. | 2 |
| Daltogard WP | 1 |
| Na₂CO₃ | 0.2 |
| Propamine A | 0.2 |
| Silicone MS.200/5 | 0.05 |

The foam product was self-extinguishing, mean extend burned being 17 mm.

EXAMPLES 34-43

Ten further flexible foams were obtained using various catalysts in the following formulations. Comparative foams using the same formulations but without T.B.P.P. and Daltogard WP were also produced.

On hot oven ageing at 140°C. it was found that the comparative foams had substantially lost their flame-resistance after 5 hours, and after 16 hours they had deteriorated so much that their relevant physical properties could not be measured. On the other hand, the foams of the invention had retained their flame-resistance, and their physical properties were only little worse than before ageing. Indeed, their tensile strength and elongation at break were better.

forming reaction mixture having an isocyanate index of less than 150 and containing (a) a compound which promotes trimerization of tolylene diisocyanate, (b) an amount of a compound containing labile halogen which inhibits heat aging of the foam caused by said trimerization promotor, and (c) a blowing agent, said polyalkylene ether polyol having a reactivity such that said reaction mixture, in the absence of special measures to the contrary, produces a closed cell foam; and said reaction mixture contains an additional polyol which is different in its constitution from said polyalkylene ether polyol and which is a polyethylene ether glycol or a poly(oxyethylene) poly(oxypropylene) glycol) wherein the poly(oxypropylene) content has a molecular weight of 500 to 2000 and wherein from 20 to 80% of its weight is oxyethylene groups at least some of which are in non-terminal positions, and said additional polyol is from 2 to 40% by weight of the total polyol.

2. A product according to claim 1 in which the polyol is a triol and the primary hydroxyl groups comprise 40 to 70% of the total number of hydroxyl groups.

3. A product according to claim 1 in which the polyol is a poly(oxyethylene) poly(oxypropylene) triol having a poly(oxyethylene) content of up to 20% by weight.

4. The product of claim 1 wherein the said mixture contains 0.5 to 4 parts of labile halogen containing compound per 100 parts polyalkylene ether polyol.

5. The product of claim 1 wherein the labile halogen containing compound is a halogenated aliphatic phosphate ester.

6. The product of claim 1 wherein the polyol is a polyalkylene ether glycol or polyalkylene ether triol.

7. The product of claim 1, wherein the labile halogen containing compound is a halogenated aliphatic phosphate ester.

8. The product of claim 7, wherein the labile halogen containing compound is a chloro- or bromo-derivative of a trialkyl ortho-phosphate.

9. The product of claim 8, wherein the labile halogen containing compound is tris 2,3-dibromopropyl ortho-phosphate.

| Example No. | 34 | 35 | 36 | 37 | 38 | 39 | 40 | 41 | 42 | 43 |
|---|---|---|---|---|---|---|---|---|---|---|
| Catalyst | Sodium Tungstate | Sodium Molybdate | Sodium Acetate | Sodium Bicarbonate | Sodium sesquicarbonate | Lithium Hydroxide | Potassium Acetate | Potassium Hydroxide | Sodium Silicate | Ni(O)(bipyridyl)₂ |
| No. of parts of catalyst | 0.8 | 0.8 | 0.6 | 0.2 | 0.2 | 0.42 | 0.6 | 0.2 | 0.4 | 0.4 |
| Propylan M.12 | 90 | 90 | 90 | 90 | 90 | 90 | 90 | 90 | 90 | 95 |
| G.978 | 10. | 10 | 10 | 10 | 10 | 10 | 10 | 10 | 10 | 5 |
| Water | 4.5 | 4.5 | 4.5 | 4.5 | 4.5 | 4.32 | 4.5 | 4.5 | 4.5 | 3 |
| T.B.P.P. | 2 | 2 | 2 | 2 | 2 | 2 | 2 | 2 | 2 | 2 |
| Daltogard WP | 1 | 1 | 1 | 1 | 1 | 1 | 1 | 1 | 1 | 1 |
| MS.200/5 | 0.05 | 0.05 | 0.05 | 0.05 | 0.05 | 0.05 | 0.05 | 0.05 | 0.05 | 0.05 |
| T.D.I. | 61.5 | 61.5 | 61.5 | 66.5 | 66.5 | 61.5 | 61.5 | 61.5 | 61.5 | 43.4 |
| Mean Extent burned mm. (BS 4735) | 54.8 | 75 | 42.3 | 28.8 | 17.5 | 47.4 | 53.7 | 32.5 | 76.2 | |

The sodium sesquicarbonate was used in the form of an aqueous solution prepared by dissolving equimolar amounts of sodium carbonate and sodium bicarbonate in water; this solution was used directly in the foam formulation without isolating the sesquicarbonate.
All the foam products had densities in the range 19–25 kg/m³.
In Example 43 there was used 0.6 part of N-ethyl morpholine.

We claim:

1. A flexible flame-retardant polyurethane foam prepared by the process which comprises reacting a tolylene diisocyanate with a polyalkylene ether polyol having from 20 to 70% primary hydroxyl groups in a foam 10. The product of claim 8, wherein the labile halogen containing compound is tris bromopropyl phosphate, tris chloropropyl phosphate, tris bromoethyl phosphate, tris chloroethyl phosphate or tris 2,3-dichloropropyl phosphate.

11. The product of claim 1, wherein the labile halogen containing compound is a halogenated aliphatic hydrocarbon or a halogenated aromatic hydrocarbon.

* * * * *